United States Patent [19]
Krupa et al.

[11] Patent Number: 5,375,990
[45] Date of Patent: Dec. 27, 1994

[54] FEED BLOCK FOR COEXTRUSION APPARATUS

[75] Inventors: Vernon J. Krupa; Harry G. Lippert; Donald R. Garton, all of Chippewa Falls, Wis.

[73] Assignee: Extrusion Dies, Inc., Chippewa Falls, Wis.

[21] Appl. No.: 943,397

[22] Filed: Sep. 10, 1992

[51] Int. Cl.⁵ .................................. B29C 47/70
[52] U.S. Cl. ........................ 425/133.5; 264/171; 425/131.1; 425/190; 425/462
[58] Field of Search .............. 425/133.1, 133.5, 146, 425/192 R, 462, 190; 264/40.7, 171

[56] References Cited

U.S. PATENT DOCUMENTS

| | | | |
|---|---|---|---|
| 3,032,008 | 5/1962 | Land et al. | 118/411 |
| 3,097,058 | 7/1963 | Branscum et al. | 264/515 |
| 3,223,761 | 12/1965 | Raley | 264/514 |
| 3,397,428 | 8/1968 | Donald | 425/133.5 |
| 3,443,277 | 5/1969 | Frielingsdorf | 425/113 |
| 3,448,183 | 6/1969 | Chisholm | 264/37 |
| 3,479,425 | 11/1969 | Lefevre et al. | 264/171 |
| 3,504,402 | 4/1970 | Wetz et al. | 425/131.1 |
| 3,557,265 | 1/1971 | Chisholm et al. | 264/46.1 |
| 3,583,032 | 6/1971 | Stafford | 425/133.5 |
| 3,587,281 | 6/1971 | Lemelson | 72/265 |
| 3,761,211 | 9/1973 | Parkinson | 425/133.5 |
| 3,807,918 | 4/1974 | Chill et al. | 425/131.5 |
| 3,860,372 | 1/1975 | Newman, Jr. | 425/131.1 |
| 3,909,170 | 9/1975 | Riboulet et al. | 425/133.5 |
| 3,927,957 | 12/1975 | Chill et al. | 425/131.1 |
| 4,152,387 | 5/1979 | Cloeren | 264/171 |
| 4,171,195 | 10/1979 | Klein et al. | 425/141 |
| 4,189,292 | 2/1980 | Hureau et al. | 425/290 |
| 4,197,069 | 4/1980 | Cloeren | 425/131.1 |
| 4,240,782 | 12/1980 | McPhee et al. | 425/467 |
| 4,285,655 | 8/1981 | Matsubara | 425/461 |
| 4,289,560 | 9/1981 | Simons | 156/244.18 |
| 4,295,812 | 10/1981 | Hoddinott | 425/114 |
| 4,405,547 | 9/1983 | Koch et al. | 264/171 |
| 4,422,839 | 12/1983 | Przytulla et al. | 425/465 |
| 4,435,141 | 3/1984 | Weisner et al. | 425/131.1 |
| 4,483,812 | 11/1984 | Hahn et al. | 264/171 |
| 4,521,359 | 6/1985 | Tsien | 264/104 |
| 4,524,099 | 6/1985 | Di Luccio | 428/213 |
| 4,533,308 | 8/1985 | Cloeren | 425/131.1 |
| 4,533,510 | 8/1985 | Nissel | 264/171 |
| 4,562,023 | 12/1985 | Pabst et al. | 264/75 |
| 4,579,696 | 4/1986 | Di Luccio | 264/22 |
| 4,600,550 | 7/1986 | Cloren | 264/171 |
| 4,619,802 | 10/1986 | Cloeren | 264/171 |
| 4,695,236 | 9/1987 | Predohl et al. | 425/131.1 |
| 4,708,618 | 11/1987 | Reifenhauser et al. | 425/133.5 |
| 4,756,858 | 7/1988 | Reifehauser et al. | 264/37 |
| 4,780,258 | 10/1988 | Cloeren | 264/171 |
| 4,784,815 | 11/1988 | Cloeren et al. | 264/171 |
| 4,789,513 | 12/1988 | Cloeren | 264/171 |
| 4,880,370 | 11/1989 | Krumm | 425/133.5 |
| 5,020,984 | 6/1991 | Cloeren et al. | 425/141 |
| 5,066,443 | 11/1991 | Cloeren | 264/171 |
| 5,102,323 | 4/1992 | Blemberg | 425/133.5 |
| 5,110,276 | 5/1992 | Farnsworth et al. | 425/133.1 |
| 5,120,484 | 6/1992 | Cloeren | 264/171 |
| 5,137,675 | 8/1992 | Rabe | 425/133.5 |
| 5,147,195 | 9/1992 | Cloeren | 425/133.5 |
| 5,211,898 | 5/1993 | Shinmoto | 425/133.5 |

FOREIGN PATENT DOCUMENTS

| | | | |
|---|---|---|---|
| 2629333A | 1/1978 | Germany . | |
| 2851930A | 6/1980 | Germany . | |
| 55-28825 | 2/1980 | Japan . | |
| 56-125 | 1/1981 | Japan . | |
| 209529 | 12/1983 | Japan | 425/461 |
| 61-89823 | 5/1986 | Japan . | |
| 62-264925 | 11/1987 | Japan . | |
| 397357 | 1/1974 | U.S.S.R. | 425/461 |

OTHER PUBLICATIONS

Patent Abstracts of Japan, vol. 9, No. 94 (M-374), Apr., 1985 of JP-A-59 220 332.
Drawings from the Davis Standard Company Showing a Feedblock Design; circa 1983.

*Primary Examiner*—Jay H. Woo
*Assistant Examiner*—Joseph Leyson
*Attorney, Agent, or Firm*—Marshall, O'Toole, Gerstein, Murray & Borun

[57] ABSTRACT

A feed block for coextrusion apparatus includes a main body and a flow distribution module removably located therein. The feed block can be readily disassembled for cleaning and maintenance and the flow distribution module may be readily interchanged with another module without the need to disassemble the feed block or other components attached thereto.

13 Claims, 8 Drawing Sheets

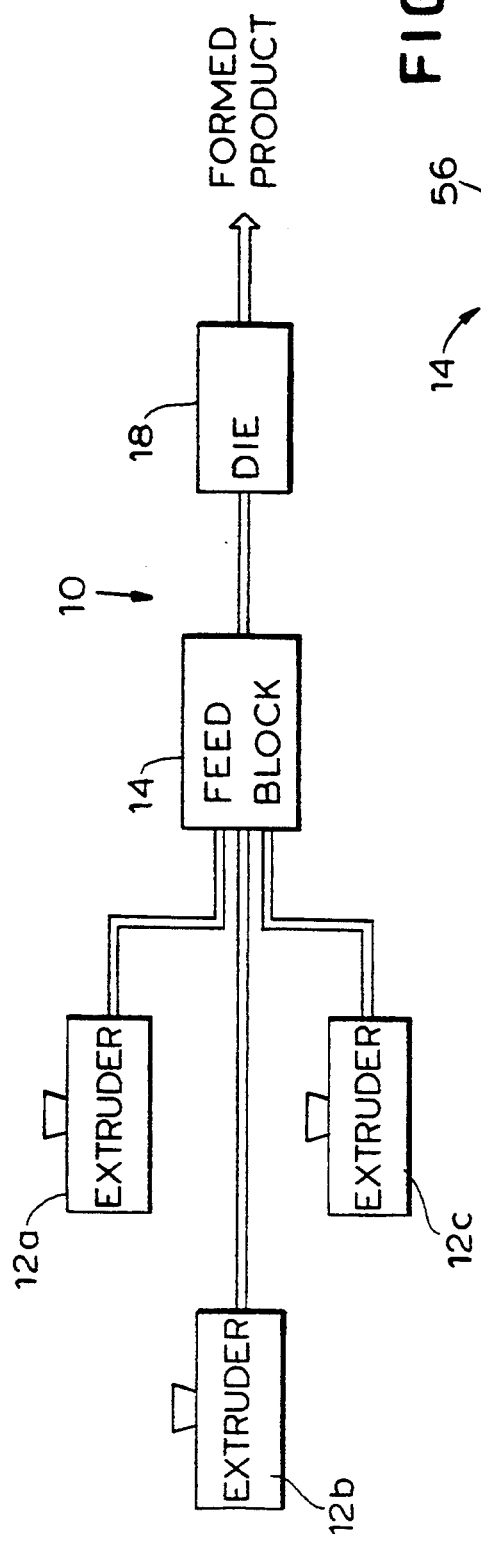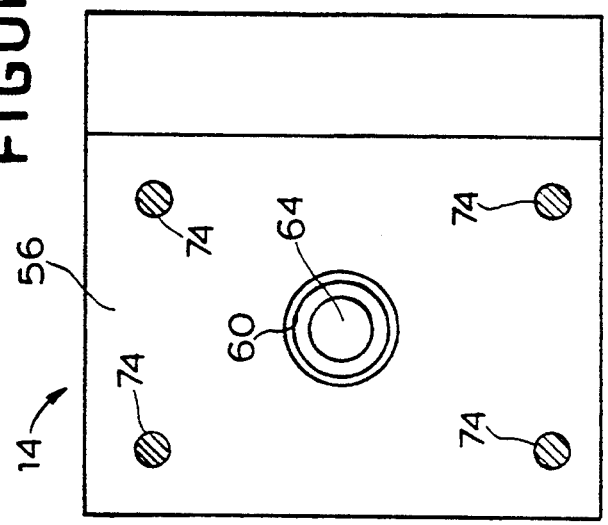

FEED BLOCK FOR COEXTRUSION APPARATUS

TECHNICAL FIELD

The present invention relates generally to flow control devices, and more particularly to a feed block for coextrusion apparatus.

BACKGROUND ART

Sheets or webs of a material are often formed using an extrusion process. For example, a thermoplastic may be heated and extruded through a die to form a sheet of desired thickness. At times, it may be desired to coextrude two or more different materials to form a laminate. This has been accomplished in the past through the use of multi-manifold dies or by combining the flows of the materials upstream of a single manifold die. In the latter case, a feed block is coupled between two or more extruders and the die and combines the flows of the various materials.

During use, there is the inevitable build up of burned or other waste material in portions of the feed block. Also, certain materials are corrosive, particularly in areas of stagnate flow. These conditions result in the need to periodically disassemble the feed block for cleaning and maintenance purposes. Also, it may prove necessary from time to time to adjust various flow parameters, such as flow velocity and volume, particularly when different materials are used over time. Previous feed block designs have not permitted ease of disassembly for cleaning and maintenance purposes, nor have they provided the ability to adjust and/or control all flow parameters.

SUMMARY OF THE INVENTION

In accordance with one aspect of the present invention, a feed block for coextrusion apparatus includes a main body having a first inlet for connection to a first extruder, a second inlet for connection to a second extruder, a first flow path coupled to the first inlet and extending to an outlet and a second flow path coupled to the second inlet and extending to a module chamber. A flow distribution module is disposed in the module chamber and includes a module flow path interconnecting the second flow path and the first flow path wherein the flow distribution module is removable from the module chamber. The flow distribution module includes means for directing the module flow path parallel to the first flow path at an edge of confluence of the module flow path and the first flow path.

In accordance with a preferred embodiment, a removable cover plate is disposed over the module chamber and a valve is preferably carried by the removable cover plate and extends into the second flow path.

Also preferably, the main body includes a pair of mating portions wherein the portions are separable from one another at parting surfaces defining the first flow path. Still further in accordance with the preferred embodiment, the flow distribution module includes first and second module portions which mate with one another at parting surfaces defining the module flow path. These features of the present invention permit the main body and flow distribution module to be readily disassembled for cleaning and maintenance.

According to specific aspects of the present invention, the first module portion preferably includes a first flow control surface disposed in the module flow path and a second flow control surface disposed in the first flow path. Also, the module flow path terminates at a module outlet disposed between the first and second module portions.

According to a further embodiment of the present invention, the main body further includes a third flow path coupled between a third inlet and an additional module chamber. Also, the feed block further includes an additional flow distribution module disposed in the additional module chamber wherein the additional flow distribution module includes an additional module flow path interconnecting the third flow path and the first flow path and wherein the additional flow distribution module is removable from the module chamber. According to a specific aspect of this embodiment, the distribution modules include opposed flow control surfaces disposed in a first flow path and further flow control surfaces disposed in the module flow paths.

According to a further aspect of the present invention, a feed block for coextrusion apparatus includes a main body having a first inlet capable of being placed in fluid communication with a first extruder, a second inlet capable of being placed in fluid communication with a second extruder, a third inlet, a first flow path coupled to the first inlet and extending to an outlet, a second flow path coupled to the second inlet and extending to a first module chamber and a third flow path coupled between the third inlet and a second module chamber wherein the main body comprises a pair of mating portions and wherein the portions are separable from one another at parting surfaces defining the first flow path. A first flow distribution module is disposed in the first module chamber and includes a first module flow path extending therethrough interconnecting the second flow path and the first flow path. A second flow distribution module is disposed in the second module chamber wherein the second flow module includes a second module flow path extending therethrough interconnecting the third flow path and the first flow path. The flow distribution modules are removable from the module chambers and each flow distribution module comprises first and second module portions which mate with one another at parting surfaces defining the module flow path extending therethrough and means for directing the module flow path parallel to the first flow path at an edge of confluence of the two flow paths.

The feed block of the present invention is readily disassembled and hence cleaning and repair are readily effected. Also, each flow distribution module is easily removed from the main body of the feed block without the need to disassemble the latter or to disconnect the feed block from other apparatus, and hence repair and/or replacement of the module is easily undertaken.

These and other aspects, features and advantages of the present invention will be apparent to those of ordinary skill in the art in view of the detailed description of the preferred embodiments, which is made with reference to the drawings, a brief description of which is provided below.

BRIEF DESCRIPTION OF THE DRAWINGS

FIG. 1 comprises a block diagram of coextrusion apparatus including a feed block according to the present invention;

FIG. 4 comprises a sectional view taken generally along the lines 4—4 of FIG. 3;

DESCRIPTION OF THE PREFERRED EMBODIMENTS

Figure 2:
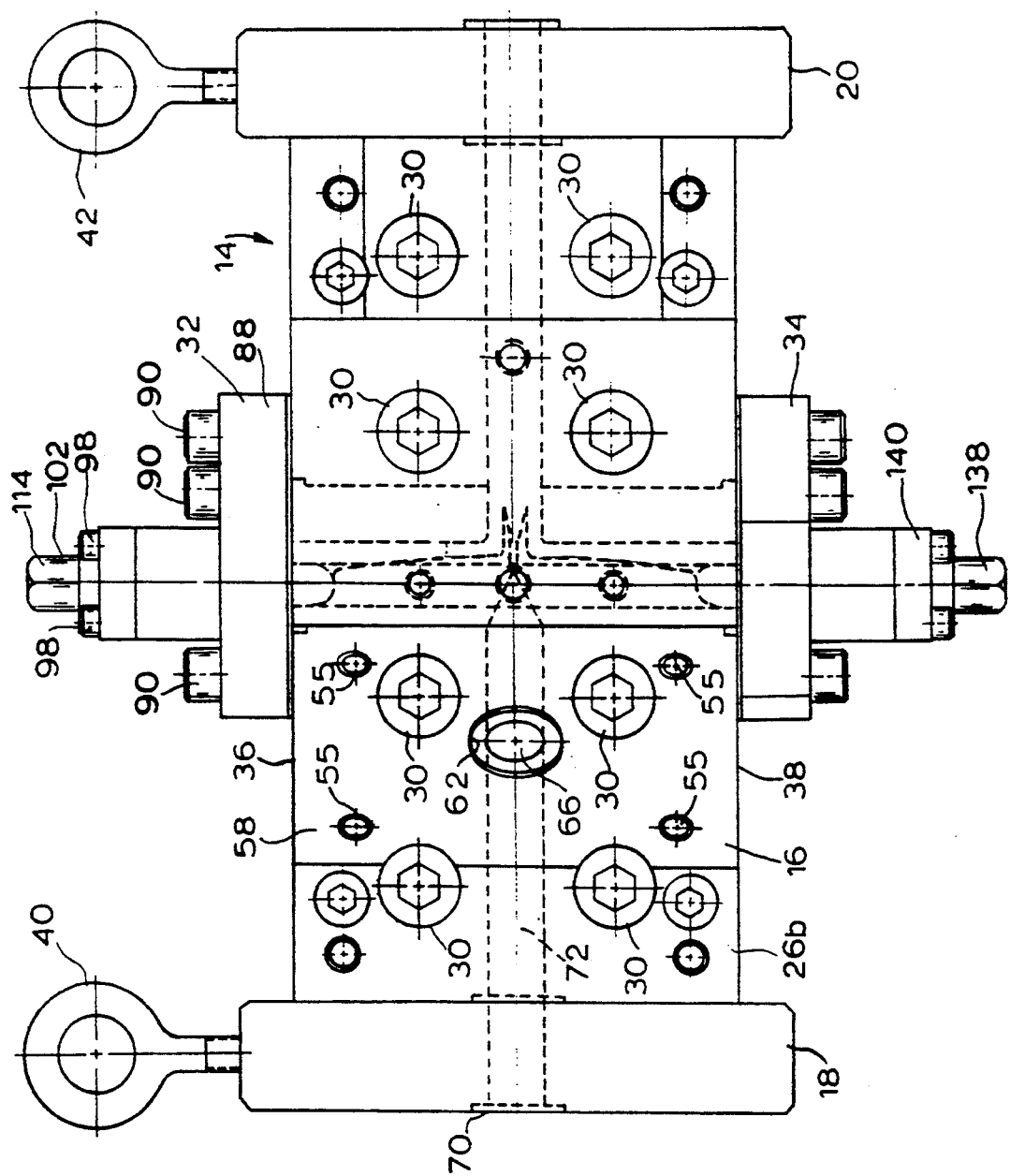
FIG. 2 comprises a side elevational view of the feed block of FIG. 1.

Referring first to FIG. 1, a coextrusion apparatus 10 includes a plurality of extruders 12a, 12b, 12c, each of which extrudes a flowable material, such as a thermoplastic, into a feed block 14 according to the present invention. The materials extruded by the extruders 12a–12c may all be different or some or all may be identical, as desired. While three extruders 12a–12c are shown as being connected to the feed block 14, it should be noted that with suitable modifications to the feed block 14, any other number of extruders might alternatively be connected thereto. The feed block 14 combines the single extrusion flows from the extruders 12a–12c into a coextrusion flow which is in turn provided to a die 18. The die 18 forms the coextruded materials into a desired form, such as a sheet, web or coating.

FIGS. 2–8 illustrate the feed block 14 in greater detail. Referring first to FIGS. 2, 3, 5 and 6, the feed block 14 comprises a main body 16 and upstream and downstream adapter flanges 18, 20 secured thereto by bolts 22, 24, respectively (seen in FIGS. 5 and 6). Bolts (not shown) extend through bores 25 in the flange 20 into threaded bores in a die (not shown) to secure the die to the flange 20 and feed block 14. The particular configuration of the adapter flanges 18, 20 depends upon the particular extruder and die which the adapter flanges are to be connected.

Figure 3:
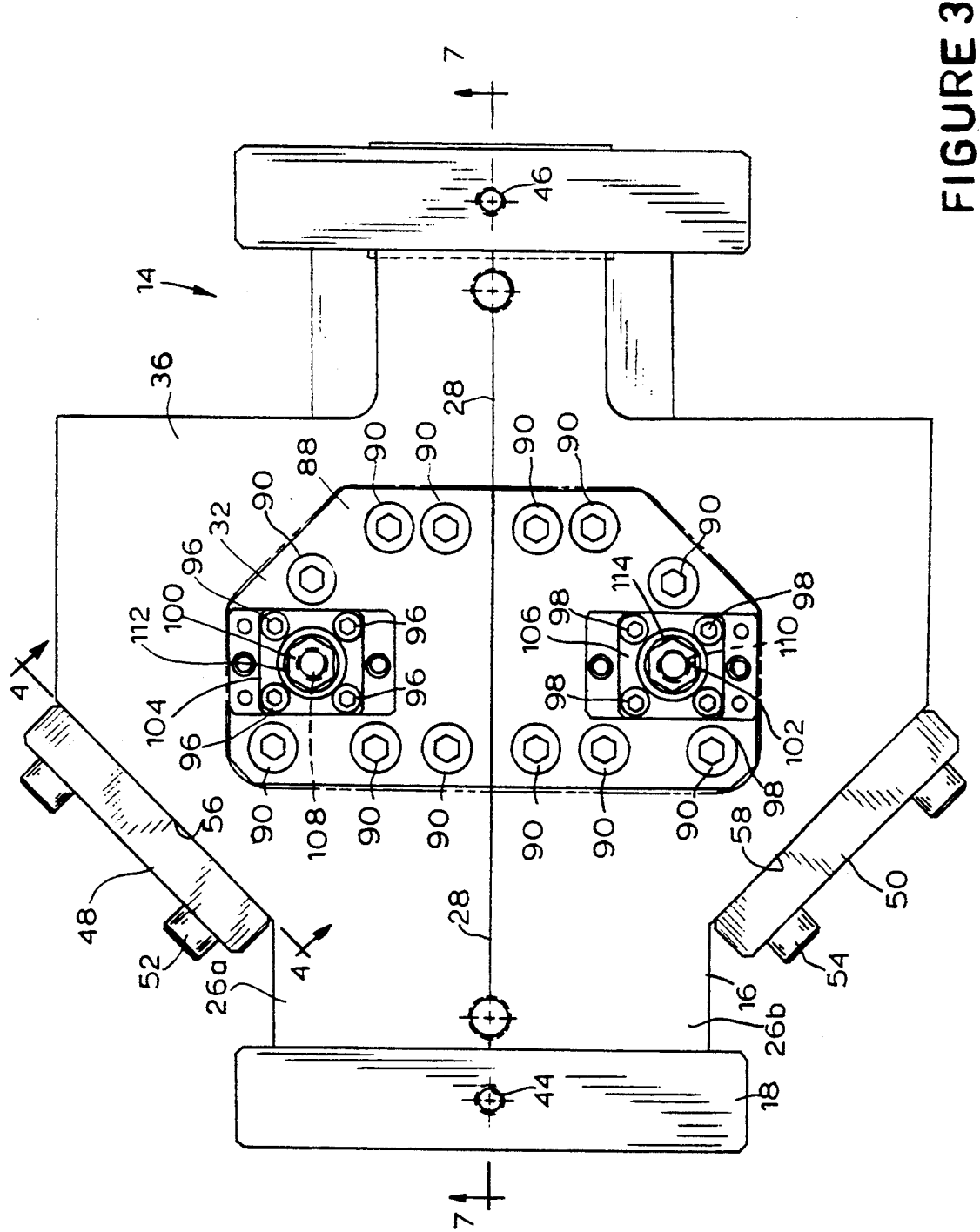
FIG. 3 comprises a plan view of the feed block of FIG. 1.
Figure 7:
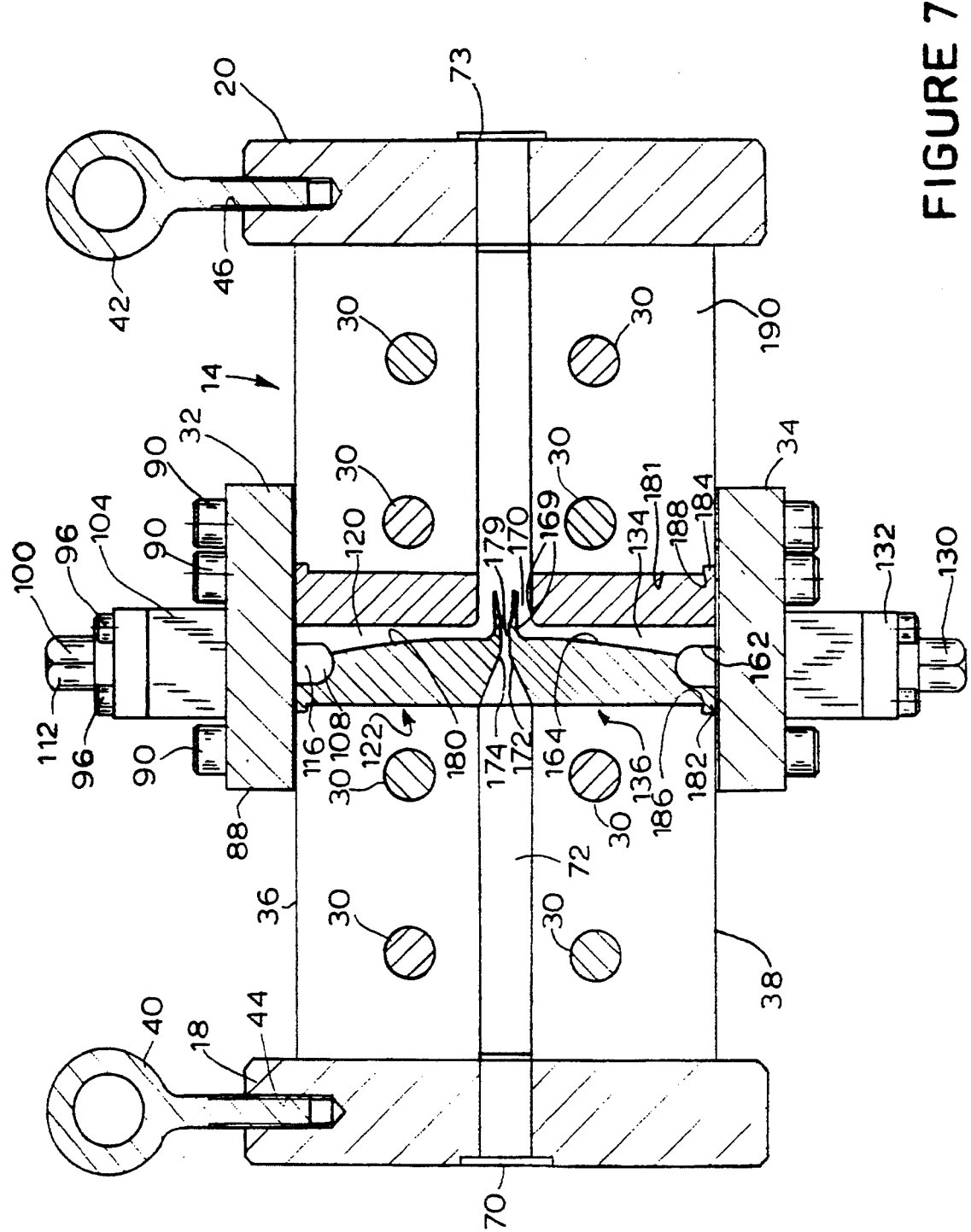
FIG. 7 comprises a sectional view taken generally along the lines 7—7 of FIG. 3.

The main body 16 comprises first and second mating portions 26a, 26b wherein the portions 26a, 26b are separable from one another at parting surfaces visible in FIG. 3 as parting line 28. As noted in greater detail hereinafter in connection with FIG. 7, the parting surfaces define a flow path through the feed block 14. As seen in FIGS. 2 and 7, the mating portions 26a, 26b are secured to one another by bolts 30 extending through the portion 26b into threaded bores in the portion 26a.

Referring now to FIGS. 2 and 3, first and second valve assemblies 32, 34 are secured to a top surface 36 and a bottom surface 38, respectively, of the feed block 14. A pair of eye bolts 40, 42, (shown only in FIGS. 2 and 7) are threaded into bores 44, 46 in the upstream and downstream adapter flanges 18, 20, respectively.

Figure 5:
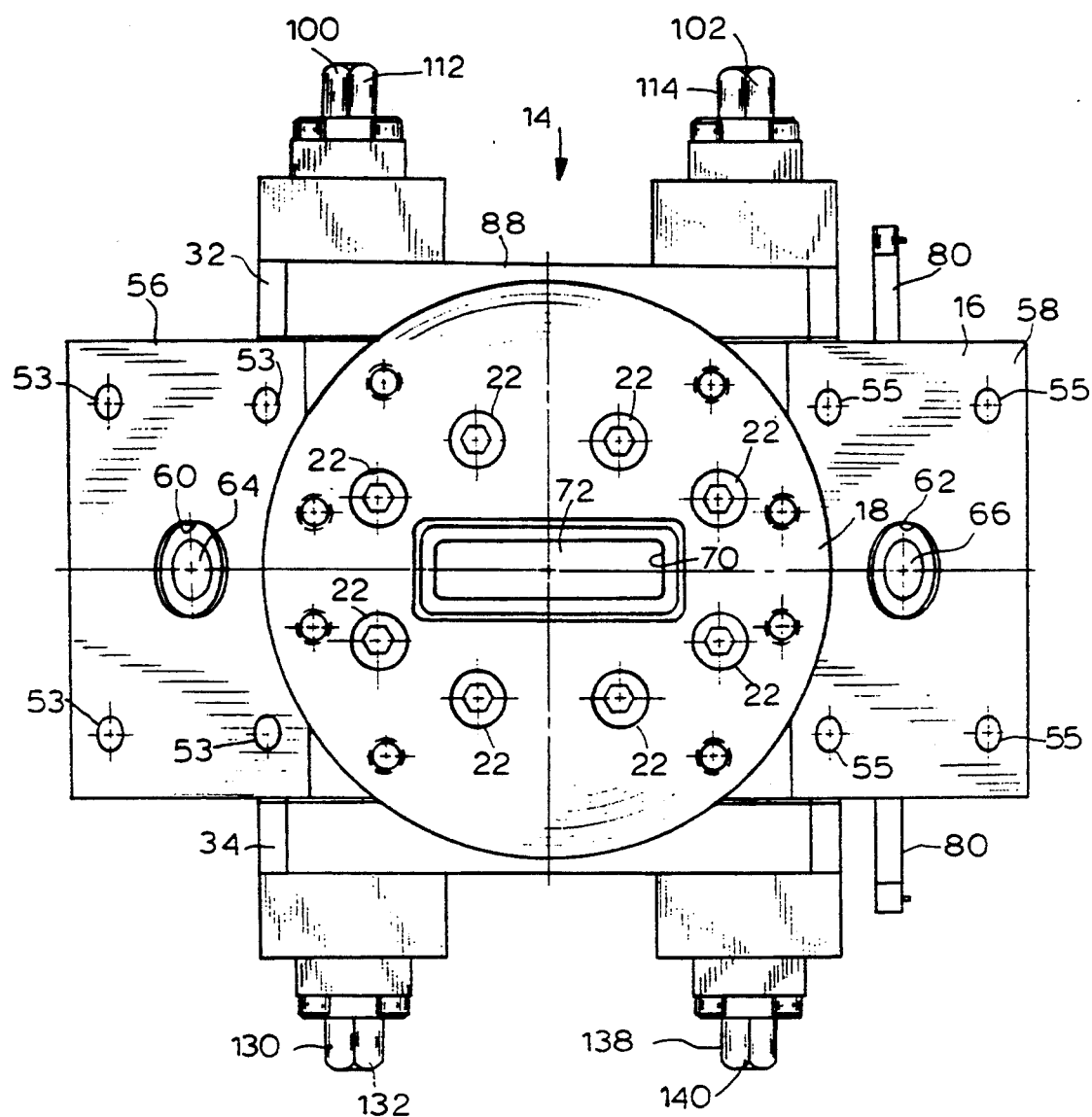
FIG. 5 comprises an elevational view of an upstream end of the feed block of FIG. 1.

A pair of extruder adapter plates 48, 50 (shown only in FIG. 3) are secured by bolts 52, 54 extending into threaded bores 53, 55, respectively, to a pair of planar faces 56, 58 of the feed block 14. Again, the particular configuration of the adapter plates 48, 50 depends upon the particular extruders to be connected thereto. With reference to FIGS. 2 and 4, each of the planar faces 56, 58 includes a shouldered circular opening 60, 62 leading to an internal bore or flow path 64, 66, respectively. As seen in FIGS. 2, 5 and 7, the flange 18 includes a rectangular opening 70 leading to a further bore or flow path 72 within the feed block 14. The flow path 72 terminates at a rectangular opening 73 in the downstream flange 20.

While the openings 60 and 62 are shown as being circular and the opening 70 is shown as being rectangular, it should be noted that each of these openings might alternatively be of a different cross-sectional configuration depending upon the particular extruders 12a–12c to which the feed block 14 is connected. If necessary or desirable, gaskets or other sealing apparatus may be placed between the feed block 14 and the upstream and downstream adapter flanges 18, 20, the valve assemblies 32, 34 and the adapter plates 48, 50 to prevent leakage.

Figure 6:
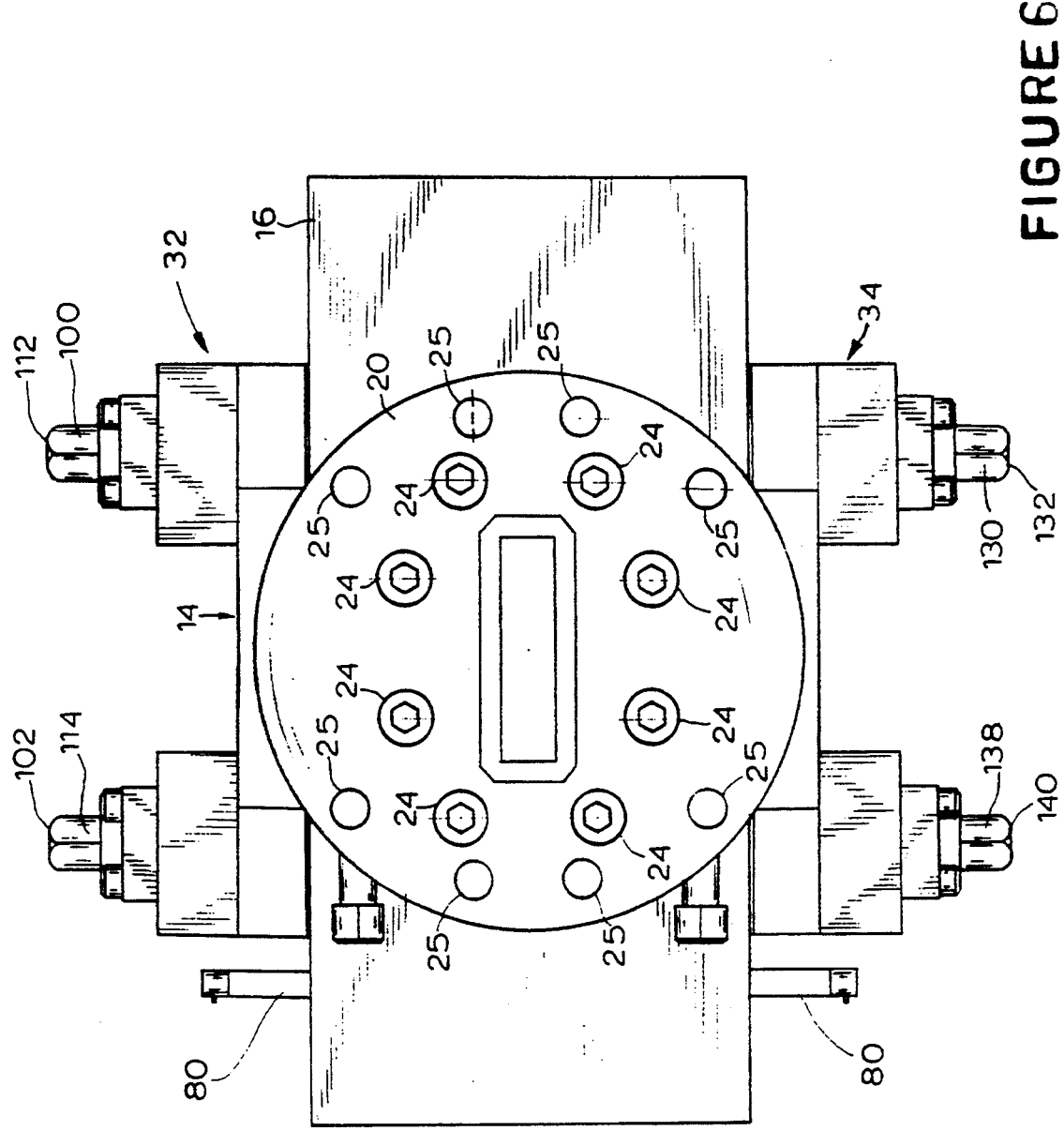
FIG. 6 comprises an elevational view of a downstream end of the feed block of FIG. 1.

In order to prevent cooling and hardening of the material as it is flowing through the feed block 14, various heaters (not shown) extend through and/or are fastened to the outside of the feed block 14. The heaters are controlled in part by thermocouples 80, two of which are seen in FIGS. 5 and 6 and which extend into the feed block 14.

Referring now to FIG. 3, the valve assemblies 32 and 34 are identical and hence only the valve assembly 32 will be described in detail. The assembly 32 includes a two-piece valve cover plate 88 secured by means of mounting screws 90 extending into threaded bores in the feed block 14. The valve cover plate 88 is machined in place on the main body 16 during fabrication, during which time the portions thereof are maintained in position on the portions 26a, 26b by dowels and jack screws (not shown).

Figure 10:
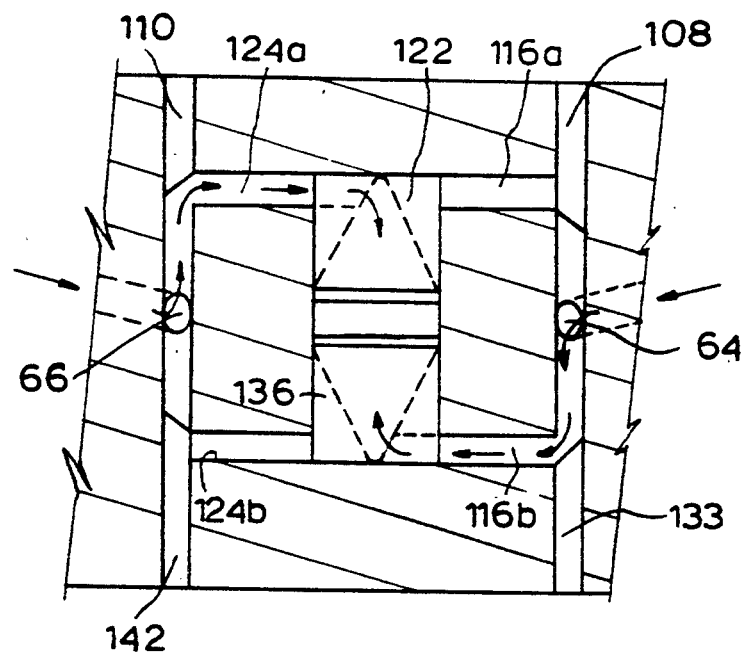
FIG. 10 comprises a schematic diagram of the flow paths leading into the flow distribution modules of FIG. 7.
Figure 9:
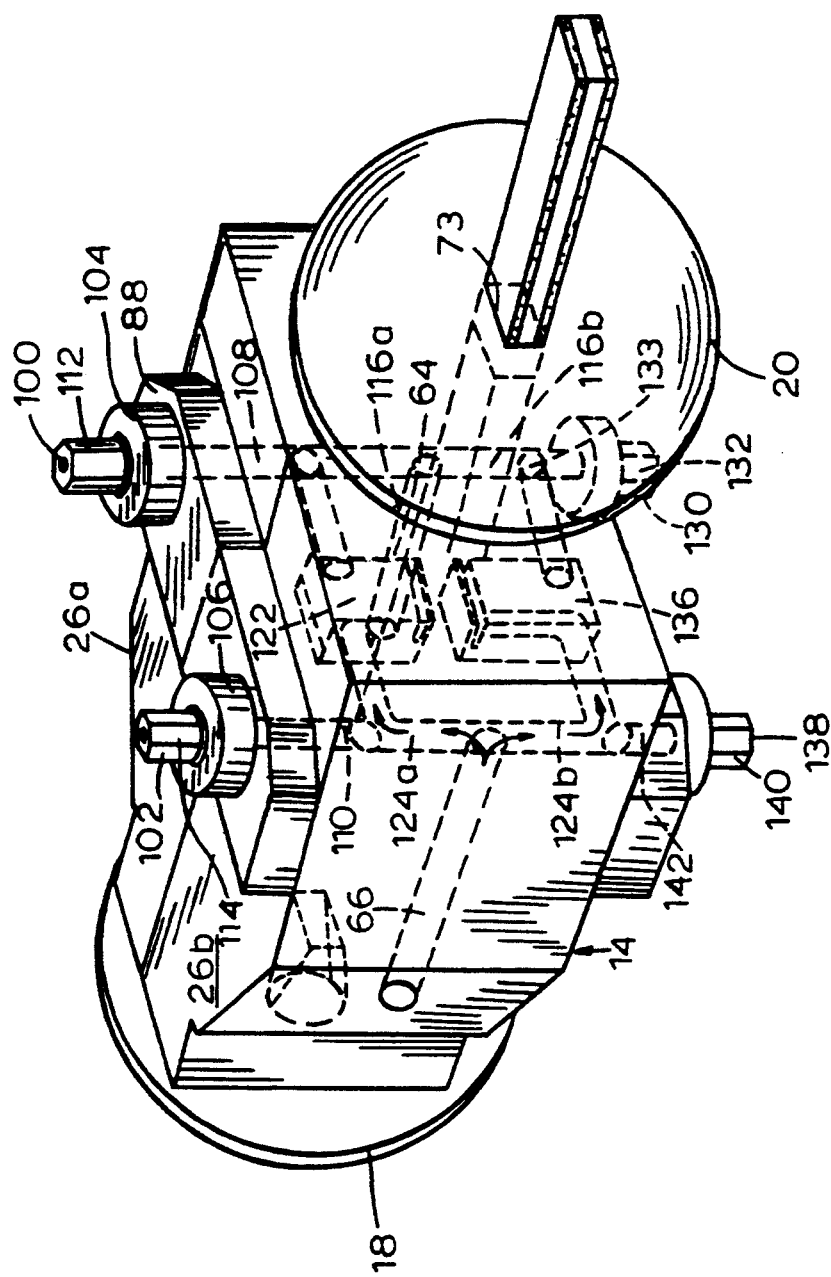
FIG. 9 comprises a diagrammatic perspective view, partially in phantom, illustrating material flows through the feed block of FIGS. 2–7.

Secured atop the plate 88 at opposite ends thereof by means of bolts 96, 98 are a pair of quill valves 100, 102. Each valve 100, 102 includes a mounting block 104, 106 through which the bolts 96, 98 extend and a tapered valve stem 108, 110 threadably engaged to a valve nut 112, 114, respectively. As seen in FIGS. 7, 9 and 10, the nut 112 may be rotated to extend or retract the valve stem 108 into or out of a flow path 116a which is in fluid communication with the flow path 64 and a module flow path 120 of a flow distribution module 122. The valve 100 thus controls the passage of material from the extruder coupled to the flow path 64 into the module flow path 120. In like fashion, rotating the nut 114 to extend or retract the valve stem 110 controls the passage of material from the extruder coupled to the flow path 66 through a flow path 124a into the module flow path 120.

Similarly, rotation of a nut 130 of a valve 132 extends or retracts a valve stem 133 in a flow path 116b interconnecting the flow path 64 and a second module flow path 134 of a second flow distribution module 136. Hence, rotation of the nut 130 controls the passage of material from the flow path 64 into the second module flow path 134. Admittance of material flowing in the flow path 66 into the second module flow path 134 is controlled by rotating a nut 138 of a valve 140, in turn extending or retracting a valve stem 142 of the valve 140 into or out of a flow path 124b interconnecting the flow path 66 and the module flow path 134.

Figure 8:
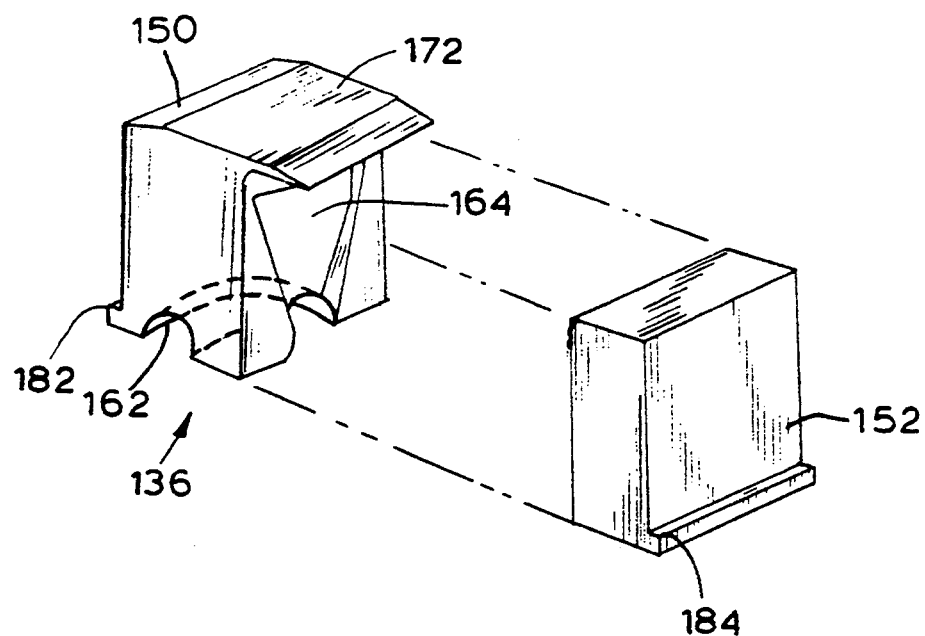
FIG. 8 comprises an exploded perspective view of the flow distribution module 136 of FIG. 7.

The flow distribution modules 122, 136 may be identical, except for differences in flow profiling and/or inlet flow direction as noted in greater detail hereinafter, and hence only the flow distribution module 136 will now be described in detail. Referring to FIG. 8, the module 136 includes a first or flow tuning portion 150 and a mating second or velocity matching portion 152. The flow tuning portion 150 includes an inlet flow channel 162 which aligns with the flow path 124b in the feed block 14. The inlet flow channel 162 permits material in the flow path 66 to be admitted from the flow path 124b into the module flow path 134. The inlet flow channel 162 may instead align with the flow path 116b if material in the flow path 64 is to be admitted into the module flow path 134. A flow channel 164 may include surfaces comprising means 169 for directing the flow of material out of the module flow path 134 into the flow path 72 in a direction parallel thereto at an edge of confluence of the module flow path 134 and the flow path 72. The velocity matching portion 152 is configured to provide a gap of a particular cross-sectional size in a region 170 (FIG. 7) such that the velocity of material exiting the module flow path 134 matches the velocity of material flowing in the flow path 72. This velocity matching reduces or eliminates interfacial shear effects caused when two polymers are joined at different flow rates.

Referring also to FIG. 7, the flow tuning portion 150 further includes a flow control surface 172 which extends into the flow path 72. The flow control surface 172 and a corresponding flow control surface 174 of the flow distribution module 122 together define the configuration of the flow path 72 at a point 179 just before convergence of the flows through the flow distribution modules 122, 136 therewith. By suitably configuring the flow control surfaces 164, 172, 174 and a flow control surface 180 of the flow distribution module 122 one can pretune the flow of materials prior to convergence.

Once the portions 150 and 152 are mated together, the assembled module 136 is inserted into a module recess 181 until a pair of retaining flanges 182, 184 are seated within shouldered portions 186, 188 of the recess 181. The valve assembly 34 is then bolted over the module 136 to retain it in place.

The feed block 14 can be configured to produce any one of a number of different coextrusion flow permutations of one, two or three different materials A, B and C. For example, FIG. 10 shows the case where a coextrusion flow of materials ABC (from top to bottom) is to be produced. In this case, a material A extruder is coupled to the flow path 66, a material B extruder is coupled to the flow path 72 and a material C extruder is coupled to the flow path 64. The module 122 has an inlet flow channel aligned with the flow path 124a while the module 136 has an inlet flow channel aligned with the flow path 116b. The valves 100 and 140 are closed while the valves 102 and 132 are opened.

As a further example, a three layer, two extrusion flow ABA can be produced by connecting an A extruder to the flow path 66 and a B extruder to the flow path 72, providing a module 136 with an inlet flow channel aligned with the flow path 124b, closing the valves 100, 132 and opening the valves 102, 140.

Other possible permutations can be produced by suitably opening and/or closing the valves 100, 102, 132, 140 and by providing approximate extruder flows to the flow paths 64, 66, 72 and by providing modules having suitably directed inlet flow channels.

As seen in FIG. 7, the main body portions 26a, 26b mate at mating surfaces, one of which is shown in FIG. 7 as surface 190. The mating surfaces, including the surface 190 define the flow path 72 therethrough. Thus, by disassembling the main body portions 26a, 26b from one another, access is available to the flow path 72, thereby facilitating cleaning and maintenance. As noted above, each of the flow distribution modules 122, 136 similarly includes module portions which mate at surfaces defining the flow path therethrough, and hence such modules can likewise be disassembled for maintenance and cleaning. Still further, the ability to remove and/or replace flow distribution modules by simply removing one or both of the valve assemblies 32, 34 to account for different materials, flow rates and other parameters or conditions or to obtain a different coextrusion flow results in reduced down time and improved working efficiency. This results from the fact that the modules can be removed without the need to disassemble the entire feed block 14 or to disassemble the feed block 14 from the extruders 12a–12c and/or the die 18.

It should be noted that the feed block 14 can be modified to provide a different number of flow paths and a different number of valves so that different coextrusion flows can be produced. Further, one or more additional modules could be added upstream or downstream of the modules 122, 136 so that a different number of coextrusion layers could be produced. For example, a feed block having two flow paths and a single module could alternatively be used to produce a two-layer coextrusion flow.

It should further be noted that, with suitable modifications, the velocity matching portion of each flow distribution module may be made moveable so that it can be moved into or out of the flow through the module in the region 170 during coextrusion flow production so that material velocity may be adjusted. Further flow tuning can be achieved by profiling the surfaces of the velocity matching portions in contact with material flow.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A feed block for coextrusion apparatus, comprising:
a main body having a first inlet for connection to a first extruder, a second inlet for connection to a second extruder, a first flow path coupled to the first inlet and extending to a main body outlet and a second flow path coupled to the second inlet and extending to a module chamber, said module chamber extending from an exterior surface of the main body to the first flow path; and
a flow distribution module disposed in the module chamber wherein the flow distribution module includes a module flow path interconnecting the second flow path and the first flow path wherein the flow distribution module is completely removable from the module chamber and wherein the flow distribution module comprises a first and a second module portion which mate with one another at parting surfaces defining the module flow path and means for directing the module flow path parallel to the first flow path at an edge of confluence of the module flow path and the first flow path wherein said flow distribution module includes a first and a second flow control surface, said first control surface defining a surface of the directing means, said second control surface disposed in the first flow path, wherein the first control surface converges with the second control surface at the edge of confluence, such that the first flow path converges with the module flow path at the edge of confluence.

2. The feed block of claim 1, further including a removable cover plate disposed over the module chamber.

3. The feed block of claim 2, further including a valve carried by the removable cover plate and extending into the second flow path.

4. The feed block of claim 1, wherein the main body includes a pair of mating portions wherein the portions are separable from one another at parting surfaces defining the first flow path.

5. The feed block of claim 1, wherein the first module portion is located upstream of the second module portion in a direction of material flow through the first flow path and wherein the first module portion includes the first and second flow control surfaces.

6. The feed block of claim 1, wherein the module flow path terminates at a module outlet disposed between the first and second module portions.

7. The feed block of claim 1, wherein the main body further includes a third flow path coupled between a third inlet and an additional module chamber extending from an exterior surface of the main body to the first flow path and wherein the feed block further includes an additional flow distribution module disposed in the additional module chamber wherein the additional flow distribution module includes an additional module flow path interconnecting the third flow path and the first flow path wherein the additional flow distribution module is removable from the additional module chamber.

8. The feed block of claim 7, wherein the additional flow distribution module includes a third and a fourth module portion which mate with one another at parting surfaces defining the additional module flow path and means for directing the additional module flow path parallel to the first flow path at a second edge of confluence, wherein said additional flow distribution module includes a third and a fourth flow control surface, said third flow control surface defining a surface of the directing means of the additional flow distribution module, said fourth control surface disposed in the first flow path, wherein the third flow control surface converges with the fourth flow control surface at the second edge of confluence, such that the additional module flow path converges with the first flow path at the second edge of confluence, and wherein the second flow control surface and the fourth flow control surface are located on opposite sides of the first flow path.

9. A feed block for coextrusion apparatus, comprising:
a main body having a first inlet for connection to a first extruder, a second inlet for connection to a second extruder, a third inlet, a first flow path coupled to the first inlet and extending to an outlet of the main body, a second flow path coupled to the second inlet and extending to a first module chamber extending from an exterior surface of the main body to the first flow paths and a third flow path coupled between the third inlet and a second module chamber extending from an exterior surface of the main body to the first flow path, wherein the main body comprises a pair of mating portions wherein the portions are separable from one another at parting surfaces defining the first flow path;
a first flow distribution module disposed in the first module chamber wherein the first flow distribution module includes a first module flow path extending therethrough and interconnecting the second flow path and the first flow path; and
a second flow distribution module disposed in the second module chamber wherein the second flow distribution module includes a second module flow path extending therethrough and interconnecting the third flow path and the first flow path;
wherein the flow distribution modules are completely removable from the module chambers;
wherein the first flow distribution module comprises a first and a second module portion which mate with one another at parting surfaces defining the first module flow path extending therethrough and means for directing the first module flow path parallel to the first flow path at a first edge of confluence of the first module flow path and the first flow path;
wherein the second flow distribution module comprises a third and a fourth module portion which mate with one another at parting surfaces defining the second module flow path extending therethrough and means for directing the second module flow path parallel to the first flow path at a second edge of confluence of the second module flow path and the first flow path;
wherein said first distribution module includes a first and a second flow control surface, said first control surface defines a surface of the directing means of the first flow distribution module said second flow control surface is disposed in the first flow path, and said first flow control surface converges with said second flow control surface at the first edge of confluence, such that the first flow path converges with the first module flow path at the first edge of confluence; and
wherein said second distribution module includes a third and a fourth flow control surface, said third control surface defines a surface of the directing means of the second flow distribution module, said fourth flow control surface is disposed in the first flow path, and said third flow control surface converges with said fourth flow control surface at the second edge of confluence such that the first flow path converges with the second module flow path at the second edge of confluence.

10. The feed block of claim 9, further including first and second removable cover plates disposed over the first and second module chambers, respectively.

11. The feed block of claim 10, further including first and second valves carried by the first and second removable cover plates, respectively, wherein the first valve extends into the second flow path and the second valve extends into the third flow path.

12. The feed block of claim 11, wherein the first and third module portions are located upstream of the second and fourth module portions, respectively, in the direction of material flow through the first flow path and wherein the first module portion includes the first and second flow control surfaces and wherein the third module portion includes the third and fourth flow control surfaces.

13. The feed block of claim 12, wherein fluid flows are established in the first flow path and in the first and second module flow paths and wherein each module flow path terminates at a module outlet.

* * * * *